United States Patent Office 2,804,585
Patented Aug. 27, 1957

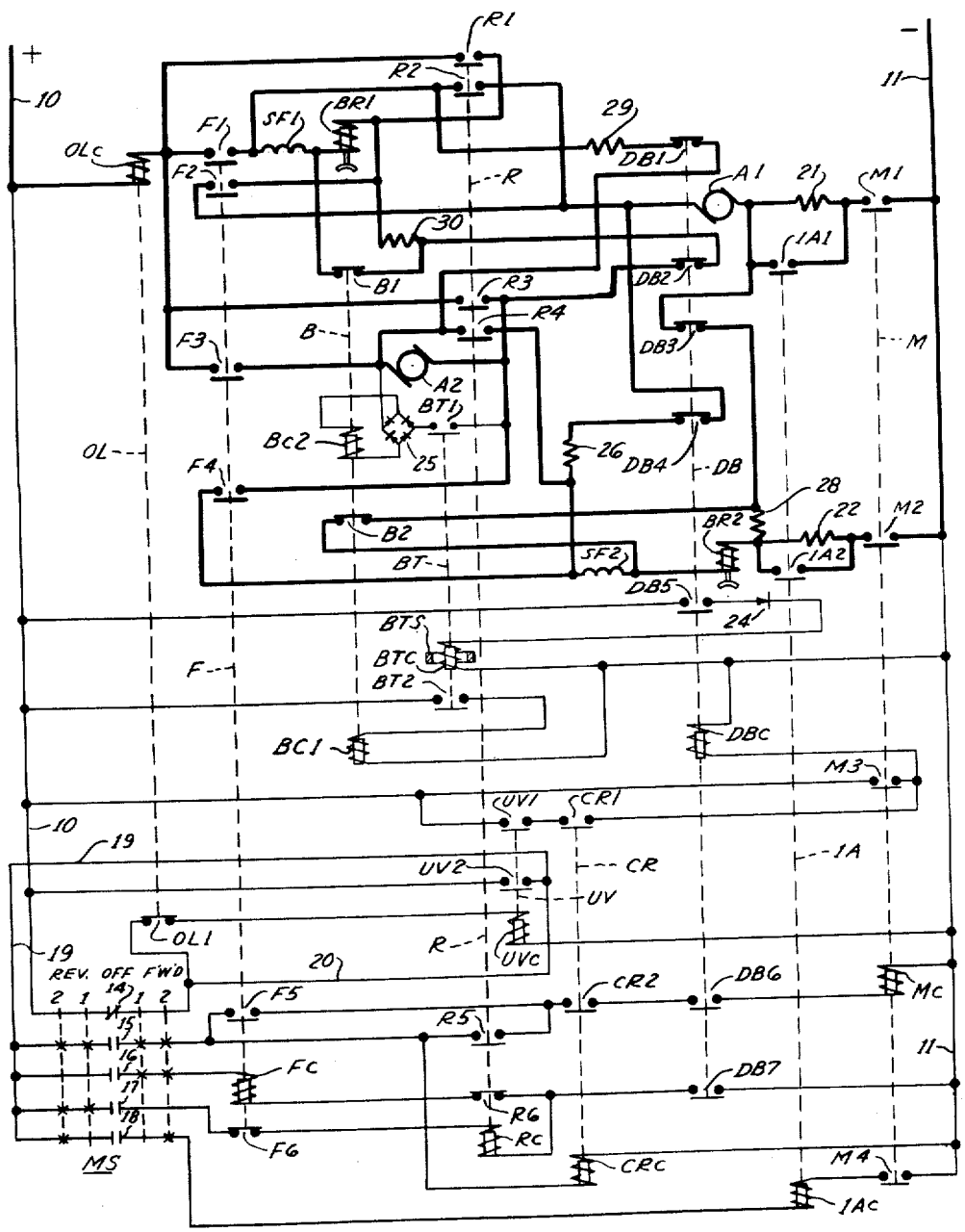

2,804,585

DIRECT CURRENT MOTOR AND BRAKE CONTROL SYSTEM

Charles A. Billante, Parma, and William K. Reed, Shaker Heights, Ohio, assignors to Square D Company, Detroit, Mich., a corporation of Michigan Application May 2, 1956, Serial No. 582,176

5 Claims. (Cl. 318—371)

This invention relates to a control system for a motor and an electro-magnetically-released friction brake associated therewith, and more particularly to an improved control system for a direct current motor and electromagnetically-released friction brake combination which system includes means for automatically delaying the setting of the friction brake for a time interval after a dynamic braking circuit for the motor has been established.

It is common practice to provide for both dynamic and friction braking of a direct current motor driving a load of relatively large inertia. In order to prevent too abrupt deceleration, it is often necessary to delay the application of the friction brake for a time interval until dynamic braking has reduced the speed. This is a simple matter when the brake is applied by a spring or gravity upon deenergization of a shunt-wound releasing coil, but in many instances, it is desirable to use a spring-applied or gravity-applied brake that is released electromagnetically by the current flowing to the motor.

When the friction brake has a series-wound releasing coil connected in series with the motor, it is sometimes possible to delay the setting of the brake merely by inserting the brake coil into the dynamic braking circuit upon removal of power from the motor so that the brake is held released by the dynamic braking current until the dynamic braking current decreases to a predetermined value. However, if there is a continuing force on the load strong enough to continue to drive the motor rapidly as a generator, the dynamic braking current does not decrease to the predetermined value with the result that the friction brake does not set, and the motor does not stop. One example of such a large continuing force is the force of a wind against an ore bridge sufficiently strong to drive the bridge during dynamic braking fast enough to cause the motors to generate sufficient voltage to hold the friction brakes released.

The present invention insures release, after a time interval, of a friction brake having its series coil connected in a dynamic braking loop even if the dynamic braking current does not decrease below the drop-out current value of the brake. In addition to providing for proper operation of the brake during dynamic braking when power is available at the control circuits, the present control system also insures proper operation of the brake during dynamic braking after failure of the power supply.

An object of this invention is to provide an improved control system for a direct current motor and a series-wound, electromagnetically-released, friction brake associated therewith.

Another object is to provide a means to automatically delay, until the proper speed is reached, the setting of a series-wound friction brake for a direct current motor under all normal and abnormal conditions.

Another object is to provide a novel relay and contactor circuit for controlling a friction brake when its operating coil is connected in a dynamic braking circuit and which prevents setting of the brake during the initial portion of the dynamic braking period whether power is available or not and which insures that the brake sets promptly at the expiration of a predetermined time after initiation of dynamic braking whether power has failed or not.

Another object is to provide means which operates automatically a predetermined time after power has been removed from a motor and a dynamic braking circuit has been established to set a series-wound friction brake and concurrently to decrease the resistance of the dynamic braking circuit.

Briefly, in accordance with this invention, a dynamic braking contactor means is picked up during normal operation of the motor and completes an energizing circuit for a time delay means including an electromagnetic relay having a time delay in its opening operation and a normally-closed, electromagnetic brake control contactor means controlled thereby. Closure of the relay consequent upon its deenergization energizes the pick-up coil of the contactor means which thereupon operates to open a shunt circuit around the operating coil of the friction brake and a portion of a dynamic braking resistor. When power is removed from the motor, the dynamic braking contactor means closes to deenergize the time delay relay and to complete a dynamic braking circuit which includes the resistor and the coil of the friction brake. A predetermined time later, the time delay relay opens causing the friction brake control contactor means to close its contacts. This completes the shunt circuit around the coil of the friction brake causing the brake to set and, at the same time, reduces the resistance in the dynamic braking circuit. The brake control contactor means has a holding coil connected across the armature of the motor which is effective in event of failure of power to hold the brake control contactor means open until the time delay relay operates.

Other objects and advantages of the invention will become apparent from the following description wherein reference is made to the drawing in which the single figure is a wiring diagram of a complete control system embodying the invention.

The embodiment of the invention illustrated is susceptible to various modifications. For example, it will become apparent that the invention can be applied to other dynamic braking circuits for two or more motors in series or in parallel and that the invention can be applied to a dynamic braking system for one instead of two motors as illustrated.

Referring to the drawing, there is shown diagrammatically a pair of direct current series motors having respective armature windings A1 and A2 and respective series field windings SF1 and SF2. The motors are provided with respective spring-applied or gravity-applied, electromagnetically-released friction brakes BR1 and BR2, and are arranged to be connected in parallel with each other to drive a common load (not shown). Forward and reverse operation of the motors is effected by selective operation of a pair of electromagnetic contactors F and R and operation of a main contactor M. Power is supplied from a positive supply line 10 and a negative supply line 11.

Any suitable dynamic braking system may be used. The one shown is known as the Wilson-Ritchie system and is fully disclosed in Wilson and Ritchie Patent No. 1,985,706. For this system of dynamic braking to be used, the motor control system must provide for the reversal of one motor by reversing the direction of current through its field winding while maintaining unchanged the polarity of the voltage impressed on its armature winding, and must provide for the reversal of the other motor by reversing the polarity of the voltage impressed on its armature winding while maintaining the current in its field winding in the same direction. As shown in the drawing, the direction of current flow in the field winding SF1 is reversed to change the direction of rotation of the first motor, and the polarity of the voltage impressed on the armature winding A2 is reversed to change the direction of rotation of the second motor.

A normally-closed electromagnetic contactor DB is arranged to complete when closed two separate dynamic braking loops one of which includes the field winding SF1 and the armature winding A2 and of the other of which includes the armature winding A1 and the field winding SF2. An operating winding of the brake BR1, which during motoring operations is in series with the first motor, is in the first of the two loops; and an operating winding of the brake BR2, which during motoring operations is in series with the second motor, is in the second of the two loops.

The system also includes a magnetic overload relay OL, an acceleration contactor 1A, and an undervoltage relay UV, an electromagnetic control relay CR, and in accordance with this invention, improved time delay means for controlling the brakes BR1 and BR2 and the resistance of the dynamic braking loops. This time delay means comprises a suitable time delay relay BT and a normally closed electromagnetic contactor B having a pick-up coil Bc1 and a holding coil Bc2. The pick-up coil Bc1 is energized from the supply lines 10 and 11 directly whereas the holding coil Bc2 receives its energization from the armature winding A2.

Manual control of the motors is obtained by a multi-position reversing master switch MS having contacts 14 through 18. The contacts 14 are closed in the off position of the master switch MS and are open in all other positions, wherein the contacts 15 through 18 are open in the off position. Closure of the contacts 15 through 18 in the other positions of the master switch MS is indicated by crosses aligned with the contacts. For example, the contacts 18 are open in the first forward and reverse positions and are closed in the second forward and reverse positions.

With power available at the supply lines 10 and 11 and the master switch MS in the off position, an energizing circuit for an operating coil UVc of an undervoltage relay UV is completed from the supply line 10 through the contacts 14, normally closed contacts OL1 of the overload relay OL and the coil UVc to the supply line 11. Completion of this circuit causes contacts UV2 of the relay UV to be closed thereby to connect the supply line 10 to a conductor 19 and to complete a holding circuit for the relay UV through a conductor 20 around the contacts 14. Contacts UV1 of the relay UV also are closed but as will become apparent complete no circuit while the master switch M is in the off position.

Movement of the master switch MS to its first forward position closes the contacts 15 and 16. Closure of the contacts 15 completes an energizing circuit for an operating coil CRc of the relay CR from the conductor 19 through the coil CRc to the conductor 11. The contacts CR1 then close to complete an energizing circuit between the supply lines 10 and 11 through the now closed contacts UV1 for an operating coil DBc of the contactor DB which thereupon opens its normally-closed main contacts DB1 through DB4 and closes its normally-open auxiliary contacts DB5, DB6, and DB7. Closure of the contacts DB7 completes an energizing circuit for an operating coil Fc of the contactor F from the conductor 19 through the contacts 16, the coil Fc, normally-closed auxiliary contacts R6 of the contactor R, and now closes contacts DB7 to the conductor 11. The contactor F responds to energization of its coil Fc to close its main contacts F1 through F4 and its auxiliary contacts F5 and to open its auxiliary contacts F6. Closure of the contacts F5 completes an energizing circuit for an operating coil Mc of the contactor M through the contacts 15 and the now-closed contacts CR2 and DB6. The contactor M thereupon closes its main contacts M1 and M2 and closes its normally-open auxiliary contacts M3 and M4.

The motor having the field winding SF1 and the armature winding A1 is now connected for forward operation from the conductor 10 through a coil OLc of the overload relay OL, the contacts F1, the field winding SF1, an operating winding of the brake BR1, the contacts F2, the armature winding A1, a resistor 21, and the contacts M1 to the line 11. Likewise, the motor having the field winding SF2 and the armature winding A2 is now connected for forward operation from the conductor 10 through the coil OLc, the contacts F3, the armature winding A2, the contacts F4, the field winding SF2, an operating winding of the brake BR2, a resistor 22, and the contacts M2 to the conductor 11.

Closure of normally-open auxiliary contacts M3 of the contactor M completes a circuit around the series-connected contacts UV1 and CR1 to insure that opening of either of these latter contacts will not cause deenergization of the contactor DB and consequent closure of the contacts DB1 through DB4 before the contacts M1 and M2 open.

Closure of the normally-open auxiliary contacts DB5 of the contactor DB completes an energizing circuit for an operating coil BTc of the relay BT, which forms part of the brake control means of this invention. This circuit is from the positive supply conductor 10 through the contacts DB5, a blocking rectifier 24, and the coil BTc to the negative supply conductor 11. The relay BT thereupon closes its contacts BT1 and BT2 immediately. Closure of the contacts BT2 completes an energizing circuit to the operating coil Bc1 of the contactor B directly from the supply conductor 10 to the supply conductor 11, and closure of the contacts BT1 connects two in-put terminals of a suitable rectifier bridge 25 across the armature A2. The holding coil Bc2 of the contactor B is connected across two out-put terminals of the rectifier bridge 25 which is so poled that when voltage exists at the armature winding A2 current always flows in the same direction in the coil Bc2 regardless of the polarity of the voltage at the armature winding A2. Upon energization of the coils Bc1 and Bc2, the contactor B opens its contacts B1 and B2 to interrupt respective shunt circuits to be described around the windings of the brakes BR1 and BR2 thereby to cause release of the brakes.

Any suitable type of time delay relay BT may be used. The preferred relay BT illustrated is of the flux decay type having a retarding sleeve BTs in its magnetic circuit which delays opening of the contacts Bc1 and Bc2 for a predetermined time after deenergization of the winding BTc. The blocking rectifier 24 prevents flow in the winding BTc of any discharge current from any windings in the system.

If it is desired to cause the motors to operate more rapidly, the master switch MS is moved into its second forward position. This closes the contacts 18 to complete an energizing circuit for an operating coil 1Ac of the contactor 1A. This energizing circuit includes the contacts M4 so that the contactor 1A cannot close before the contactor M. The contactor 1A then responds to exclude the resistors 21 and 22 from the respective motor circuits by closing its main contacts 1A1 and 1A2, respectively.

When the master switch MS is moved from the off position in the reverse direction, operation similar to that just described occurs except that the contactor R responds instead of the contactor F. The operating circuit for the contactor R is through the contacts 17, normally closed auxiliary contacts F6, an operating coil Rc, and the contacts DB7 to the supply line 11. During reverse operation, contacts R5 complete the circuit for the coil Mc instead of the contacts F5. The power circuit for reverse operation of the motor having the armature winding A1 and the field winding SF1 is from the conductor 10 through the coil OLc, the contacts R1, the coil of the brake BR1, the field winding SF1, the contacts R2, the armature winding A1, the resistor 21 or the contacts 1A1, and the contacts M1 to the conductor 11. The power circuit for the motor having the armature winding A2 and the field winding SF2 is from the conductor 10 through the coil OLc, the contacts R3, the armature winding A2, the contacts R4, the field winding SF2, the coil of the brake BR2, the resistor 22 or the contacts 1A2, and the contacts M2 to the conductor 11.

The operation of the braking control means provided in accordance with this invention for delaying the setting of the brakes BR1 and BR2 and for reducing the resistance of the dynamic braking loops will now be described. Assuming, for example, that the motors have been operating in the forward direction at maximum speed, return of the master switch MS to the off position causes deenergization of the operating coils 1Ac, Mc, Fc, and CRc. The contactor 1A opens its contacts 1A1 and 1A2 and the contactors M and F return to their normal positions removing power from the motors. The contacts CR1 and M3 open causing deenergization of the coil DBc and consequent closure of the contacts DB1 through DB4. The contacts DB5 also open to remove power from the coil BTc but the contacts BT1 and BT2 do not open at once due to the flux decay delaying action of the retarding sleeve BTs.

Closure of the contacts DB1 through DB4 completes two separate dynamic braking loops. One of the dynamic braking loops is from the left-hand side of the armature winding A1 through the contacts DB4, the resistor 26, the field winding SF2 from left to right, the coil of the brake BR2, a resistor 28, and the contacts DB3 to the right-hand side of the armature winding A1. The other of the dynamic braking loops is from the left-hand side of the armature winding A2 through the contacts DB1, a resistor 29, the field winding SF1 from left to right, the coil of the brake BR1, a resistor 30, and the contacts DB2 to the right-hand side of the armature winding A2. The field winding SF2 of the second motor is now connected in a closed loop with the armature winding A1 of the first motor, and the field winding SF1 of the first motor is connected in a closed loop with the armature winding A2 of the second motor. The connections are such that dynamic braking current starts to flow in both loops causing retardation of the motors and holding the brakes BR1 and BR2 released.

A predetermined time after deenergization of the winding BTc, the relay BT drops out and opens its contacts BT1 and BT2 causing deenergization of the coils Bc1 and Bc2. The contactor B thereupon closes its contacts B1 and B2. Closure of the contacts B1 completes a by-pass circuit around the coil of the brake BR1 and the resistor 30, and closure of the contacts B2 completes a similar by-pass circuit around the coil of the brake BR2 and the resistor 28. The brakes BR1 and BR2 thereupon set and the resistance of each dynamic braking circuit is reduced causing an increase in the dynamic braking currents. The fact that the resistors 28 and 30 are in series with the respective brake coils insures setting of the brakes even though the contact resistance of the contacts B1 and B2 is relatively large. From the foregoing it is seen that even if the motors should be driven by an extraneous force so that the dynamic braking current did not decrease materially, the brakes BR1 and BR2 set upon drop out of the relay BT.

If power at the supply conductors 10 and 11 should fail at any time during operation of the motors, the same two dynamic braking loops are established automatically, since the operating coils of the contactors F, R, M and DB become deenergized causing drop out of these contactors. With the dynamic braking loops established, each of the armature windings A1 and A2 generates a voltage to provide dynamic braking currents in the respective loops. The operating coil Bc1 of the contactor B also is deenergized when power fails, but the contactor B remains in its operated position with its contacts B1 and B2 open until the relay BT drops out. This is because the holding coil Bc2 remains energized from the voltage at the armature winding A2 and not from the supply lines 10 and 11. The brakes BR1 and BR2 are thus maintained released by the dynamic braking current as before. When the relay BT drops out after its time interval, its contacts BT1 open to deenergize the coil Bc2. The contactor B then closes its contacts B1 and B2 to shunt the brake coils as before.

Having thus described our invention, we claim:

1. A control system and motor combination comprising a direct current motor having an armature winding and a field winding, means for connecting said armature winding and said field winding to a source of power for causing operation of said motor, a brake for said motor having means including an operating coil which, when the coil is energized, renders said brake ineffective, and, when the coil is deenergized, renders said brake effective, means connecting said coil in series with said armature winding when said armature winding is connected to said source thereby to render said brake ineffective, a resistor, means operative upon disconnection of said armature winding from said source to connect, in series with each other in a dynamic braking loop, said armature winding, said operating coil, and said resistor, and time delay means operative to disconnect said operating coil from said loop an interval after said armature winding is disconnected from said source thereby to render said brake effective while maintaining the armature winding and resistor in series with each other in said loop.

2. A control system and motor combination according to claim 1 characterized in that said time delay means is operative to reduce the effective resistance of said resistor an interval after the armature winding is disconnected from the source.

3. A control system and motor combination according to claim 2 characterized in that said intervals are substantially equal.

4. A control system and motor combination according to claim 1 characterized in that said time delay means includes means to maintain said time delay means operative normally by said source of power, and, upon failure of said source, by the voltage across said armature winding.

5. A control system and motor combination according to claim 1 characterized in that said time delay means operates to close a shunt circuit around both said operating coil and at least a portion of said resistor.

References Cited in the file of this patent

UNITED STATES PATENTS

| | | |
|---|---|---|
| 1,773,409 | Schnable | Aug. 19, 1930 |
| 2,155,373 | Cooke | Apr. 18, 1939 |
| 2,194,759 | Logan | Mar. 26, 1940 |

U. S. DEPARTMENT OF COMMERCE

PATENT OFFICE

CERTIFICATE OF CORRECTION

Patent No. 2,804,585                                  August 27, 1957

Charles A. Billante et al.

It is hereby certified that error appears in the printed specification of the above numbered patent requiring correction and that the said Letters Patent should read as corrected below.

Column 3, line 56, for "M" read -- MS --; line 73, for "closes" read -- closed --; column 4, line 31, for "brake" read -- braking --.

Signed and sealed this 15th day of April 1958.

(SEAL)
Attest:
KARL H. AXLINE

Attesting Officer

ROBERT C. WATSON
Commissioner of Patents